(12) United States Patent
Maltsev et al.

(10) Patent No.: US 7,394,873 B2
(45) Date of Patent: Jul. 1, 2008

(54) ADAPTIVE CHANNEL ESTIMATION FOR ORTHOGONAL FREQUENCY DIVISION MULTIPLEXING SYSTEMS OR THE LIKE

(75) Inventors: Alexander A. Maltsev, Nizhny Novgorod (RU); Andrey V. Pudeyev, Nizhny Novgorod (RU); Ali S. Sadri, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 620 days.

(21) Appl. No.: 10/379,650

(22) Filed: Mar. 5, 2003

(65) Prior Publication Data

US 2004/0120428 A1  Jun. 24, 2004

Related U.S. Application Data

(63) Continuation-in-part of application No. 10/323,344, filed on Dec. 18, 2002, now abandoned.

(51) Int. Cl.
*H04L 27/00* (2006.01)
(52) U.S. Cl. .................. 375/324; 375/143; 375/341
(58) Field of Classification Search ............. 375/130, 375/132, 142, 143, 147, 150, 341, 152, 324; 708/314
See application file for complete search history.

(56) References Cited

U.S. PATENT DOCUMENTS

| | | | | |
|---|---|---|---|---|
| 4,353,067 A * | 10/1982 | Mims | .................. | 342/201 |
| 4,829,574 A * | 5/1989 | Dewhurst et al. | ............ | 704/236 |
| 5,602,484 A * | 2/1997 | Suzuki et al. | ................ | 324/647 |
| 5,673,294 A * | 9/1997 | Namekata | .................... | 375/341 |
| 6,097,770 A * | 8/2000 | Bahai et al. | .................. | 375/343 |
| 6,246,732 B1 * | 6/2001 | Kobayashi et al. | .......... | 375/346 |
| 6,990,061 B2 * | 1/2006 | Deneire et al. | .............. | 370/210 |
| 2001/0036235 A1 * | 11/2001 | Kadous | ...................... | 375/341 |
| 2003/0026360 A1 * | 2/2003 | Ramasubramanian et al. | .... | 375/343 |
| 2003/0081659 A1 * | 5/2003 | Yousef et al. | ................ | 375/148 |
| 2006/0274817 A1 * | 12/2006 | Lakkis | ........................ | 375/141 |

FOREIGN PATENT DOCUMENTS

| | | |
|---|---|---|
| EP | 0 954 142 | 11/1999 |
| WO | WO 02/43270 | 5/2002 |
| WO | PCT/US2004/003152 | 2/2004 |

OTHER PUBLICATIONS

Tripathi V. et al. "Multiple Access Interference Resistant Channel Acquisition For Wideband CDMA Signals", XP000968011, May 15, 2000, pp. 956-960.

* cited by examiner

*Primary Examiner*—Chieh M. Fan
*Assistant Examiner*—Freshteh N. Aghdam
(74) *Attorney, Agent, or Firm*—Trop, Pruner & Hu, P.C.

(57) ABSTRACT

Briefly, in accordance with one embodiment of the invention, a channel estimator may be adapted to provide a channel estimate based at least in part on an estimated delay spread. The channel estimator may be adapted to provide a more accurate channel estimation in the event of a lower estimated delay spread. In one embodiment, the channel estimator provides a frequency domain channel estimate, and in another embodiment the channel estimator provides a time domain channel estimate.

25 Claims, 3 Drawing Sheets

A) THRESHOLD TECHNIQUE FOR ADAPTIVE LS WITH SMOOTHING

B) THRESHOLD TECHNIQUE FOR ADAPTIVE ML

ADAPTIVE CHANNEL ESTIMATION FOR ORTHOGONAL FREQUENCY DIVISION MULTIPLEXING SYSTEMS OR THE LIKE

CROSS-REFERENCE TO RELATED APPLICATIONS

The present application is a continuation-in-part of U.S. application Ser. No. 10/323,344 filed Dec. 18, 2002, now abandoned.

BACKGROUND

In typical orthogonal frequency multiplexing systems, a guard interval may be specified to account for any delay spread. Generally, the channel length may be unknown, so typical channel estimation schemes may a priori assume that the channel length is equal to the guard interval. However, under some operating circumstances, the actual delay spread encountered may not be as long as the guard interval, in which case it is inefficient to assume that the channel length is equal to the guard interval. Therefore, it may be desirable to provide a system that estimates an actual delay spread encountered by the system and that utilizes the estimated delay spread to provide a more accurate channel estimate.

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
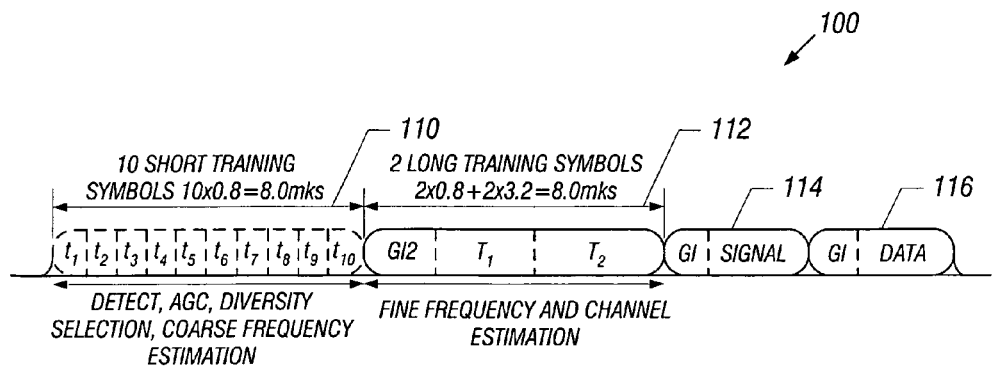
FIG. 1 is a timing diagram of an orthogonal frequency division multiplexing preamble structure in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general-purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAM), electrically programmable read-only memories (EPROM), electrically erasable and programmable read only memories (EEPROM), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PD's). wireless local area networks (WLANs) and the like.

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like.

Referring now to FIG. 1, a timing diagram of an orthogonal frequency division multiplexing (OFDM) preamble structure in accordance with one embodiment of the present invention will be discussed. In embodiment, the preamble structure 100 shown in FIG. 1 may be compliant with a standard promulgated by the Institute of Electrical and Electronics Engineers (IEEE) such as an IEEE 802.11a standard, although the scope of the invention is not limited in this respect. A training sequence 110 of preamble 100 may be subdivided into 10 training symbols t1, t2, t3, t4, t5, t5, t7, t8, t9, and t10. In one embodiment, the training symbols may be 0.8 microseconds in duration, for a total of 8.0 microseconds for training interval 110, although the scope of the invention is not limited in this respect. During training sequence 110, operations such as signal detection, automatic gain control (ACG), diversity selection, and coarse frequency estimation may occur.

Figure 2:
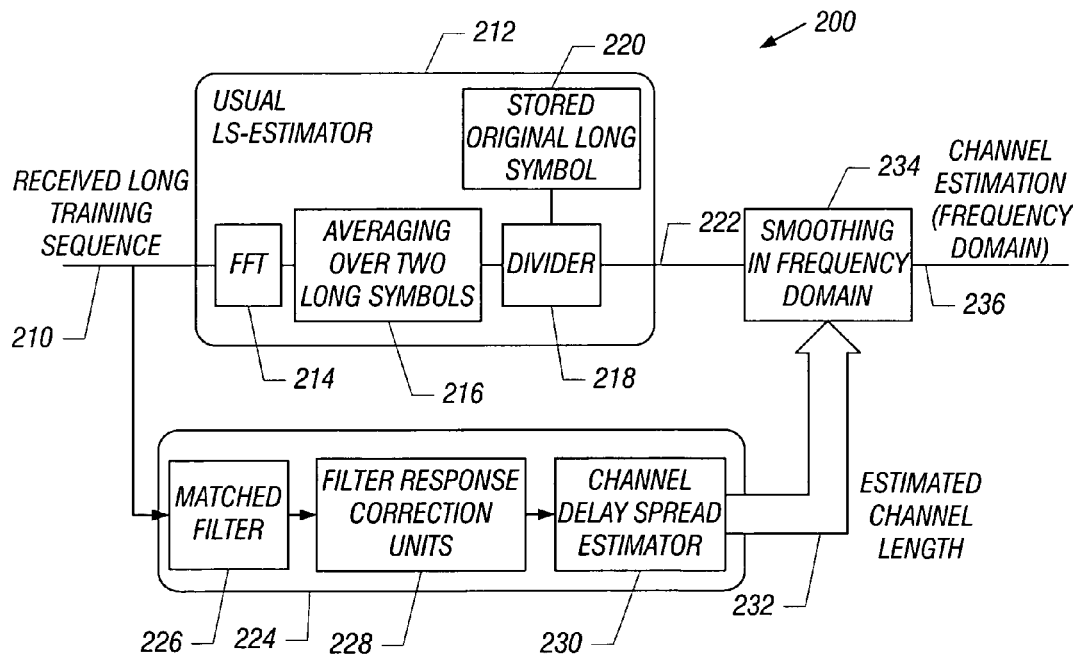
FIG. 2 is a block diagram of an adaptive channel estimator using frequency domain channel estimation in accordance with one embodiment of the present invention.
Figure 3:
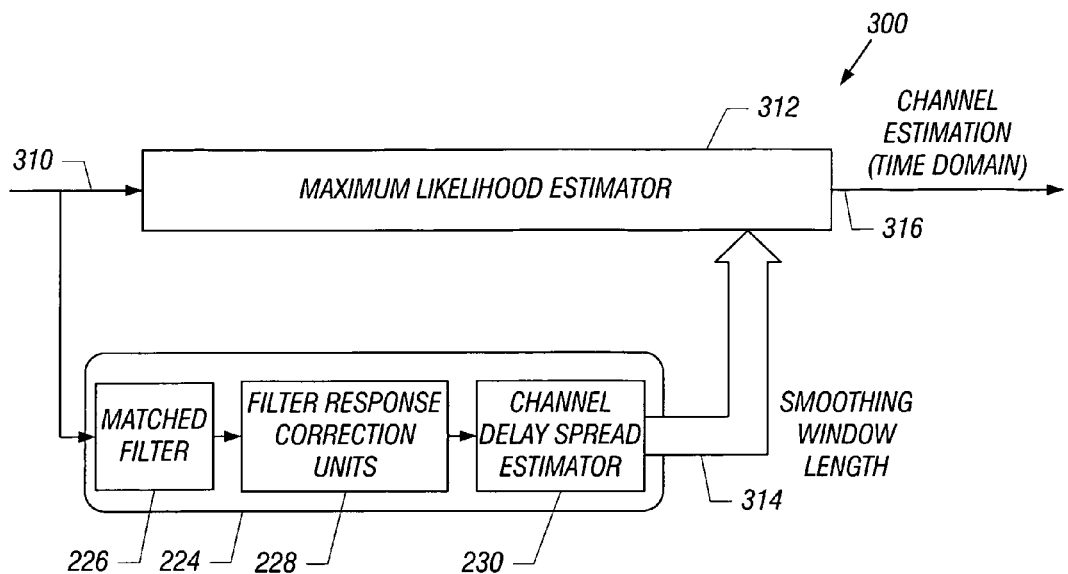
FIG. 3 is a block diagram of an adaptive channel estimator using time domain channel estimation in accordance with one embodiment of the present invention.

Training sequence 110 may be followed by another training sequence 112 which may contain two training intervals T1 and T2 preceded by a guard interval G12. In one embodiment, the duration of a training interval 112 may be 3.2 microseconds in duration with 0.8 microseconds of guard interval for each training interval, for a total guard interval G12 of 1.6 microseconds, where the overall duration of training sequence 112 being 8.0 microseconds, although the scope of the invention is not limited in this respect. During training sequence 112, operations such as fine frequency estimation and channel estimation may occur. In one embodiment of the invention, a channel estimator as shown in FIG. 2 may carry out channel estimation in the frequency domain 200, or alternatively a channel estimator as shown in FIG. 3 may carry out channel estimation in the time domain, although the scope of the invention is not limited in this respect. Subsequent to training sequence 110 and training sequence 112, the signal symbol 114 and data symbols 116 may be received, each being preceded by a respective guard interval GI, although the scope of the invention is not limited in this respect.

Referring now to FIG. 2, block diagram of an adaptive channel estimator using frequency domain channel estimation in accordance with one embodiment of the present invention will be discussed. Frequency domain channel estimator 200 may receive training sequence 112 at input 210 to a least square (LS) channel estimator 212. In one embodiment of the invention, an estimator may be defined as a block that calculates a quantity based on known data to provide information about an unknown quantity. A least square estimator may provide an estimate of an unknown quantity using a minimal sum of the deviations squared, the least square error, from a given set of known data, although the scope of the invention is not limited in this respect. Training sequence 112 may be fed into a fast-Fourier transform (FFT) block 214, which may be used to process training symbols T1 and T2 as well as processing of data symbols 116. The output of FFT 214 may be averaged over two symbols at block 216, and then at block 218 the averaged output may be divided by known training symbols stored in block 220 in the frequency domain. The output 222 of LS estimator block 212 may be a least square transfer function estimate, although the scope of the invention is not limited in this respect.

Figure 5:
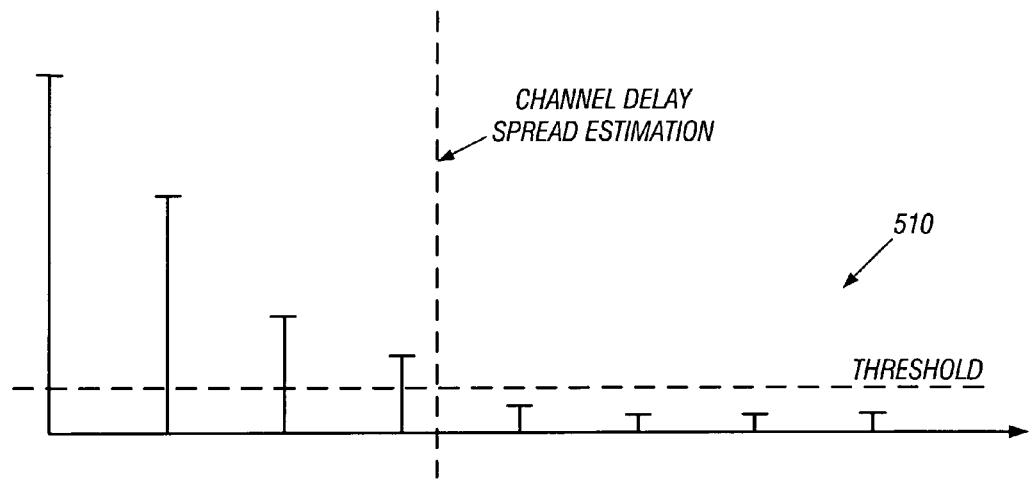
FIG. 5 are diagrams of techniques illustrating the truncation of smaller rays below a predetermined threshold value and a channel delay spread estimation, and the extraction of significant rays in accordance with one or more embodiments of the present invention.
Figure 5:
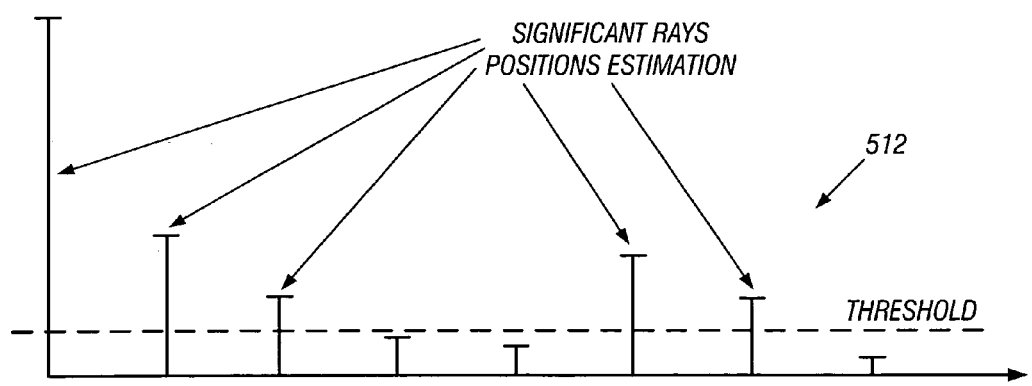

Training sequence 112 at input 210 may also be applied to block 224, which may include a matched filter 226. Matched filter 226 may also be utilized for fine frame synchronization. The output of matched filter 226 may be passed through a filter response correction unit 228 which may be utilized to cancel side lobes of the filter response of matched filter 226 on the main channel ray, for example the line of sight component, and to improve detection of delayed rays. For such a purpose, filter response correction unit 228 may produce subtraction of the ideal long training symbol autocorrelation function from the real response of matched filter 226. The output of filter response correction unit 228 may be passed through a channel delay spread estimator 230, which in one embodiment may be a threshold device with one or more appropriately chosen thresholds, depending on a predetermined signal to noise ratio (SNR), to truncate negligibly smaller rays with larger delays. The diagram of FIG. 5 illustrates the smaller rays truncation and channel delay spread estimation for this case at diagram 510. Channel delay spread estimator 230 may estimate a channel delay spread, which is the estimated channel length at output 232, as the time delay inside which the main part of the signal energy may be concentrated, although the scope of the invention is not limited in this respect. Estimating the delay spread via channel delay spread estimator 230 and block 224 may allow frequency domain channel estimator 200 to improve the accuracy of the least square transfer function estimation, although the scope of the invention is not limited in this respect.

The output 222 of LS estimator 212 may be combined with the estimated channel length output 232 at a smoothing in frequency domain block 234. Smoothing in frequency domain block 234 LS channel estimates from LS estimator 212 may be smoothed in the frequency domain using a Hamming window or the like. The frequency window length may be inversely proportional to the channel length according to the following equation:

$$L_{WINDOW} = \frac{K}{L_{CHANNEL}}$$

where $L_{WINDOW}$ is the frequency window length, K is a coefficient which for a Hamming window may be approximately 32 in one embodiment, and $L_{CHANNEL}$ is the estimated channel length in samples. In one embodiment, the sample interval may be 50 nanoseconds, although the scope of the invention is not limited in this respect. The overall output 236 of frequency domain channel estimator 200 is the output of smoothing in frequency domain block 234, which may provide frequency domain channel estimation. The output 236 of frequency domain channel estimator 200 may be an adaptively smoothed channel transfer function estimate where the smoothing window length may be adjusted in correspondence to a signal-to-noise ratio level and frequency-selective channel transfer function variance to improve the accuracy of the channel estimate.

Referring now to FIG. 3, a block diagram of an adaptive channel estimator using time domain channel estimation in accordance with one embodiment of the present invention will be discussed. Time domain channel estimator 300 may receive a training sequence at input 310 of maximum likelihood (ML) estimator block 312. In one embodiment, a maximum likelihood estimator utilizes a maximum of a likelihood function, which is a mathematical probability function of the values for an unknown set of data based upon a known, observed set of data, although the scope of the invention is not limited in this respect. The input 310 may also be applied to block 224, which in one embodiment may correspond to block 224 of FIG. 2. The complexity of ML estimator block 312 using an ML channel estimation scheme may be dependent on the channel length, where a larger channel length may require larger computational complexity and processing time. Generally, channel length may be unknown, so that ML channel estimation would assume the channel length to be equal to guard interval G12, which in one embodiment may be 800 nanoseconds. Estimating the delay spread via channel delay spread estimator 230 and block 224 may allow ML estimator 312 to know in advance the needed number of channel coefficients that should be estimated, i.e., the number of channel rays. Such knowledge leads to estimation accuracy improvement due to the knowledge of estimated parameters number. For example, for a typical indoor environment, delay spread may range up to 200 nanoseconds, whereas without a delay spread estimation, an ML estimation of the channel response function may be based on a guard interval duration, about an 800 nanosecond interval, although the scope of the invention is not limited in this respect.

The output 314 of block 224 may provide a channel response length estimate to block 312 based on an estimated channel delay spread provided by channel delay spread estimator 230 so that an ML estimation performed by ML estimator 312 may be based on an actual channel delay spread. A channel estimation calculation provided by ML estimator 312 may utilize conventional maximum likelihood (ML) algorithms. In the event of a shorter delay spread determined by block 224, more accurate estimation can be performed using less computational load. As a result, time domain channel estimator 300 may adapt a channel estimation determination to an actual estimated delay spread, although the scope of the invention is not limited in this respect. Likewise, smoothing in frequency domain performed in block 234 of frequency domain channel estimator 200 of FIG. 2 may be equivalent to the reduction of the number of estimated channel response coefficients in time domain channel estimator 300.

Figure 4:
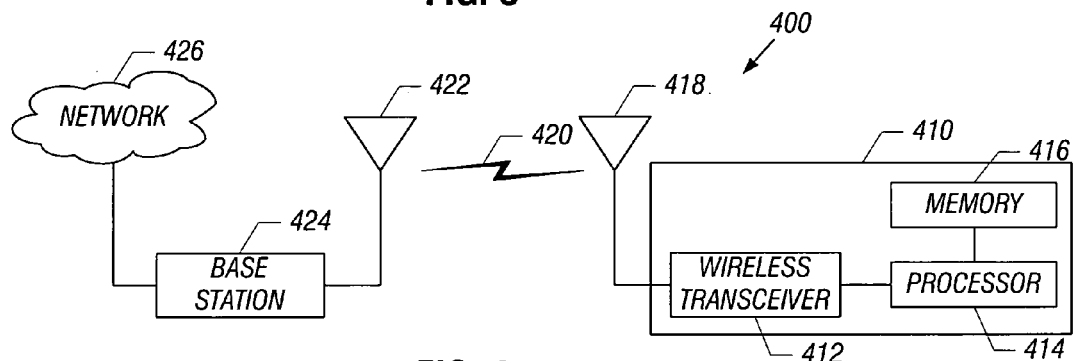
FIG. 4 is a block diagram of an alternative adaptive channel estimator using time domain channel estimation in accordance with one embodiment of the present invention.

Referring now to FIG. 4, a block diagram of an alternative adaptive channel estimator using time domain channel estimation in accordance with one embodiment of the present invention will be discussed. The adaptive channel estimator 300 of FIG. 4 includes a maximum likelihood estimator block 312 using an ML channel estimation scheme that may be utilized to estimate channel with non-monotonous channel impulse response function, channels with few strong echoes. In this case, the channel impulse response may consist of a smaller number of significant rays with relatively larger delays between the rays. The output of filter response correction unit 228 may be passed through a channel significant rays extractor 430, which in one embodiment may be a threshold device with one or more appropriately chosen thresholds, depending on a predetermined signal to noise ratio (SNR), truncating negligibly smaller rays and keeping a few significant rays only. The diagram of FIG. 5 illustrates significant rays extraction for this case at diagram 512. In this respect, channel significant rays extractor 430 may determine a few significant rays which contain the main part of the signal energy, although the scope of the invention is not limited in this respect.

Estimating the number and delays of channel significant rays via channel significant rays extractor 430 and block 424 may allow ML estimator 312 to know in advance the needed number of channel coefficients that should be estimated, for example the number and positions of the significant rays. Such knowledge may lead to estimation accuracy improvement due to the knowledge of estimated parameters number.

Figure 6:
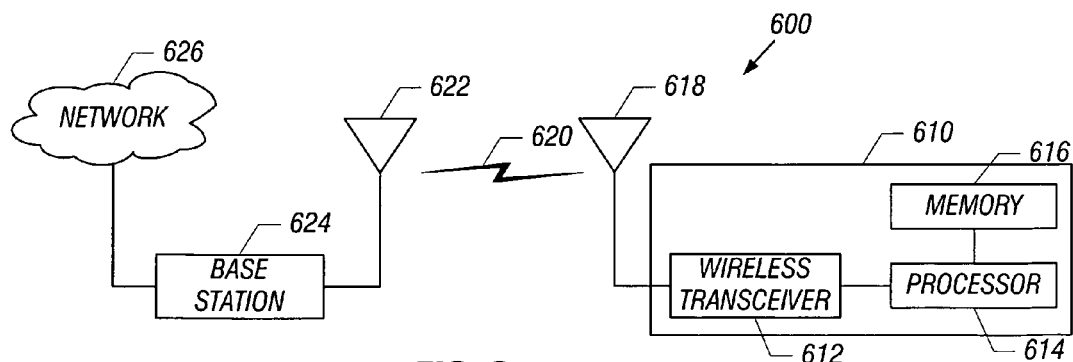
FIG. 6 is a block diagram of a wireless system in accordance with an embodiment of the present invention.

Referring now to FIG. 6, a block diagram of a wireless system in accordance with an embodiment of the present invention will be discussed. A wireless system 600 as shown in FIG. 6 may include a wireless terminal 610 that may communicate with a base station 624 via a wireless link 620. In one embodiment of the invention, wireless system 600 may be compliant with an IEEE standard such as an IEEE 802.11a standard, or compliant with an OFDM standard such that communications between base station 624 and wireless terminal 610 via wireless link 620 may occur in accordance with the appropriate standard, although the scope of the invention is not limited in this respect. Although FIG. 6 shows a wireless system 600 wherein wireless terminal 410 may communicate with base station 624 in an infrastructure mode, in an alternative embodiment wireless terminal 610 may communicate with one or more other wireless terminals or devices in an ad-hoc mode, although the scope of the invention is not limited in this respect.

Wireless terminal 610 may include a wireless transceiver 612 to couple to antenna 618, processor 614, and memory 616. In one embodiment of the invention, channel estimators 200 or 300 may be embodied as hardware as part of wireless transceiver 612, or alternatively may be embodied at least in part or entirely as instructions executed by processor 614, for example where processor 614 is a digital signal processor (DSP). In one particular embodiment, channel estimators 200 or 300 may be embodied on a removable module, for example a PC card module, capable of being utilized by wireless terminal 610, or alternatively the channel estimator may be integrated within the hardware of wireless terminal 610, for example being integrated into a chipset where wireless terminal may be a portable computer, although the scope of the invention is not limited in this respect. Wireless terminal 610 may access a network 626 by communicating with base station 624, which may include an appropriate antenna 622. Base station 624 may also include channel estimator 200 or 300 when communicating with wireless terminal 610 to provide more accurate channel estimation in accordance with the present invention, although the scope of the invention is not limited in this respect.

Although the invention has been described with a certain degree of particularity, it should be recognized that elements thereof may be altered by persons skilled in the art without departing from the spirit and scope of the invention. It is believed that the communications subsystem for wireless devices or the like of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. An apparatus, comprising:
   a frequency domain smoother to provide a frequency domain channel estimate based at least in part on a least square channel estimate and an estimated delay spread
   a least square estimator coupled to the frequency domain smoother to provide the least square channel estimate; and
   an estimation block coupled to the frequency domain smoother to provide the estimated delay spread, wherein the estimation block includes at least a matched filter, a filter response correction unit coupled to the matched filter, and a channel delay spread estimator coupled to the filter response correction unit, and wherein an output of the matched filter is provided to the filter response correction unit and wherein an output of the filter response correction unit is provided to the channel delay spread estimator, said unit to subtract an ideal long training symbol autocorrelation function from the response of the matched filter.

2. An apparatus as claimed in claim 1, wherein the least square estimator provides the least square channel estimate in response to a received training sequence, and wherein the estimation block provides the estimated delay spread in response to the received training sequence.

3. An apparatus as claimed in claim 1, wherein said frequency domain smoother is adapted to provide the frequency domain channel estimate based at least in part on a Hamming window.

4. An apparatus as claimed in claim 1, wherein said frequency domain smoother is adapted to provide the frequency domain channel estimate based at least in part on an estimated delay spread of less than or equal to about 200 nanoseconds.

5. An apparatus, comprising:
   a maximum likelihood estimator to provide a maximum likelihood channel estimate in response to a received training sequence, wherein said maximum likelihood estimator is adapted to provide a time domain channel estimate based at least in part on an estimated delay spread; and
   an estimation block coupled to the maximum likelihood estimator to provide the estimated delay spread, wherein the estimation block includes at least a matched filter, a filter response correction unit coupled to the matched filter, and a channel delay spread estimator coupled to the filter response correction unit, and wherein an output of the matched filter is provided to the filter response correction unit and wherein an output of the filter response correction unit is provided to the channel delay spread estimator, said unit to subtract an ideal long training symbol autocorrelation function from the response of the matched filter.

6. An apparatus as claimed in claim 5, wherein the estimation block is to determine the estimated delay spread in response to the received training sequence.

7. An apparatus as claimed in claim 5, wherein said maximum likelihood estimator is adapted to determine a number of channel coefficients to provide the time domain channel estimate based at least in part on the estimated delay spread.

8. An apparatus as claimed in claim 5, wherein said maximum likelihood estimator is adapted to provide the time domain channel estimate based at least in part on an estimated delay spread of less than or equal to 200 nanoseconds.

9. An apparatus, comprising:
   a maximum likelihood estimator to provide a maximum likelihood channel estimate in response to a received training sequence, wherein said maximum likelihood estimator is adapted to provide a time domain channel estimate based at least in part on an estimated number and delays of significant rays; and
   an estimation block coupled to the maximum likelihood estimator to provide the estimated number and delays of significant rays, wherein the estimation block includes at least a matched filter, a filter response correction unit coupled to the matched filter, and a channel significant rays extractor coupled to the filter response correction unit, and wherein an output of the matched filter is provided to the filter response correction unit and wherein an output of the filter response correction unit is provided to the channel delay spread estimator, said unit to subtract an ideal long training symbol autocorrelation function from the response of the matched filter.

10. An apparatus as claimed in claim 9, wherein the estimation block is to determine the number and delays of the significant rays in response to the received training sequence.

11. An apparatus as claimed in claim 9, wherein said maximum likelihood estimator is adapted to determine a number and delays of significant channel coefficients to provide the time domain channel estimate.

12. A method, comprising:
    determining a delay spread estimate by applying a training sequence to a matched filter, performing filter response correction on an output of the matched filter by subtracting an ideal long training symbol autocorrelation function from the response of the matched filter, and subsequently performing a channel delay spread estimation; and
    providing a channel estimate determined at least in part on the delay spread estimate.

13. A method as claimed in claim 12, said providing a channel estimate including providing a time domain channel estimate.

14. A method as claimed in claim 12, said providing a channel estimate including providing a frequency domain channel estimate.

15. A method as claimed in claim 12, wherein said providing a channel estimate is based at least in part on a Hamming window.

16. A method as claimed in claim 12, wherein said providing a channel estimate is based at least in part on an estimated delay spread of less than or equal to 200 nanoseconds.

17. An article comprising a storage medium having stored thereon computer readable instructions that, when executed by a computing platform, result in adapting a channel estimate to an estimated delay spread by:
    determining a delay spread estimate by applying a training sequence to a matched filter, performing filter response correction on an output of the matched filter by subtracting an ideal long training symbol autocorrelation function from the response of the matched filter, and subsequently performing a channel delay spread estimation; and
    providing a channel estimate determined at least in part on the delay spread estimate.

18. An article as claimed in claim 17, wherein the instructions, when executed, further result in providing a time domain channel estimate.

19. An article as claimed in claim 17, wherein the instructions, when executed, further result in providing a frequency domain channel estimate.

20. An article as claimed in claim 17, wherein the instructions, when executed, further result in basing the channel estimate at least in part on a Hamming window.

21. An article as claimed in claim 17, wherein the instructions, when executed, further result in basing said providing a channel estimate at least in part on an estimated delay spread of less than or equal to about 200 nanoseconds.

22. An apparatus, comprising:
  a channel estimator to provide a channel estimate in response to a received training sequence;
  a delay spread estimator to determine an estimated delay spread in response to the received training sequence, wherein the delay spread estimator includes at least a matched filter, a filter response correction unit coupled to the matched filter, and a channel delay spread estimator coupled to the filter response correction unit, and wherein an output of the matched filter is provided to the filter response correction unit and wherein an output of the filter response correction unit is provided to the channel delay spread estimator, said unit to subtract an ideal long training symbol autocorrelation function from the response of the matched filter;
  wherein said channel estimator is adapted to provide the channel estimate based at least in part on the estimated delay spread; and
  a non-volatile memory device in which at least one of the channel estimate and the estimated delay spread may be stored.

23. An apparatus as claimed in claim 22, wherein said channel estimator is adapted to provide a more accurate channel estimate with a shorter estimated delay spread.

24. An apparatus as claimed in claim 21, wherein said channel estimator is adapted to provide the channel estimate based at least in part on a Hamming window.

25. An apparatus as claimed in claim 21, wherein said channel estimator is adapted to provide the channel estimate based at least in part on an estimated delay spread of less than or equal to about 200 nanoseconds.

* * * * *